United States Patent [19]

Boutet

[11] Patent Number: 5,186,338
[45] Date of Patent: Feb. 16, 1993

[54] PALLET FOR HOLDING A CASSETTE

[75] Inventor: John C. Boutet, Rochester, N.Y.

[73] Assignee: Eastman Kodak Company, Rochester, N.Y.

[21] Appl. No.: 728,425

[22] Filed: Jul. 11, 1991

[51] Int. Cl.$^5$ ............................................... A47F 5/00
[52] U.S. Cl. ....................................... 211/41; 211/194; 108/53.1; 206/509; 206/455
[58] Field of Search ................. 211/41, 194; 108/53.1; 206/509, 455

[56] References Cited

U.S. PATENT DOCUMENTS 3,905,541 9/1975 Paxton ........................... 206/509 X
3,917,108 11/1975 Thurman ....................... 108/53.1 X Primary Examiner—Robert W. Gibson, Jr.
Attorney, Agent, or Firm—Frank Pincelli

[57] ABSTRACT

A pallet holds a cassette that has a projection and a recess for registering the cassette relative to the pallet. The pallet has a surface that supports the cassette with a recess in the surface for receiving the projection on the cassette and a projection on the surface for receiving the recess in the cassette. A pair of rails project upwardly above the surface by a distance sufficient to allow a similar pallet to be stacked on top of the rails without interfering with the movement of the cassette on the surface. Locating elements on the rails accurately position one pallet on top of another.

8 Claims, 5 Drawing Sheets

PALLET FOR HOLDING A CASSETTE

BACKGROUND OF THE INVENTION

This invention relates to a pallet for holding and transporting a cassette, and more particularly to a pallet which facilitates handling of multiple size cassettes of the kind used in computed radiography.

It is known from U.S. Pat. No. 4,878,799, issued Nov. 7, 1989, to provide a machine for unloading film sheets from magazines. More specifically, a machine as disclosed in such patent has moveable trays for supporting a plurality of magazines, and the trays are spaced from each other in a vertical direction. The trays are supported by an elevator for movement in a vertical direction as a unit. When a tray is at a particular vertical position, the tray and magazine are moved to an unloading position where sheets in the magazine can be removed by suction cups. The removed sheets are then fed to a cassette or to a photographing device for exposure.

In computed radiography a photographic element, such as a storage phosphor sheet or rigid plate, is exposed to form a latent image. The exposed photographic element is taken to a reader where the photographic element is stimulated to emit a light pattern that can be read and recorded. Then the photographic element is erased and can be reused again. It is common to manually transport the cassette containing the photographic element from the exposure apparatus to the reader and manually insert it into the reader. The operator then waits until the image is read, the photographic element is erased and returned to the operator. While this procedure may be satisfactory, it requires much time and effort by the operator. Operator time is increased when the reader is relatively slow in reading and erasing the photographic element, and this procedure can require more than a full minute of time. It clearly is desirable to minimize the time required by an operator, and to do so in a way which makes it feasible to automate the feeding of a series of cassettes to the reader.

SUMMARY OF THE INVENTION

Accordingly, it is an object of the invention to provide a pallet for holding a cassette of the kind used in computed radiography which simplifies the handling of the cassette and reduces the operator time required to provide the cassette to a reader.

Another object of the invention is to provide a pallet of the kind mentioned above which makes it feasible to automate feeding of the cassettes sequentially to a reader.

In accordance with the present invention, a pallet is provided for holding a cassette. The pallet has a surface for supporting the cassette. Structural features on the surface and the cassette enable the cassette to be registered at a desired position on the surface of the pallet. A pair of rails on opposite sides of the surface project above the surface by a distance sufficient to allow a similar pallet to be stacked on top of the rails without interference with a cassette on the surface. The rails have locating means thereon for accurately positioning one pallet on top of the other pallet in a predetermined relationship.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENTS

Figure 1:
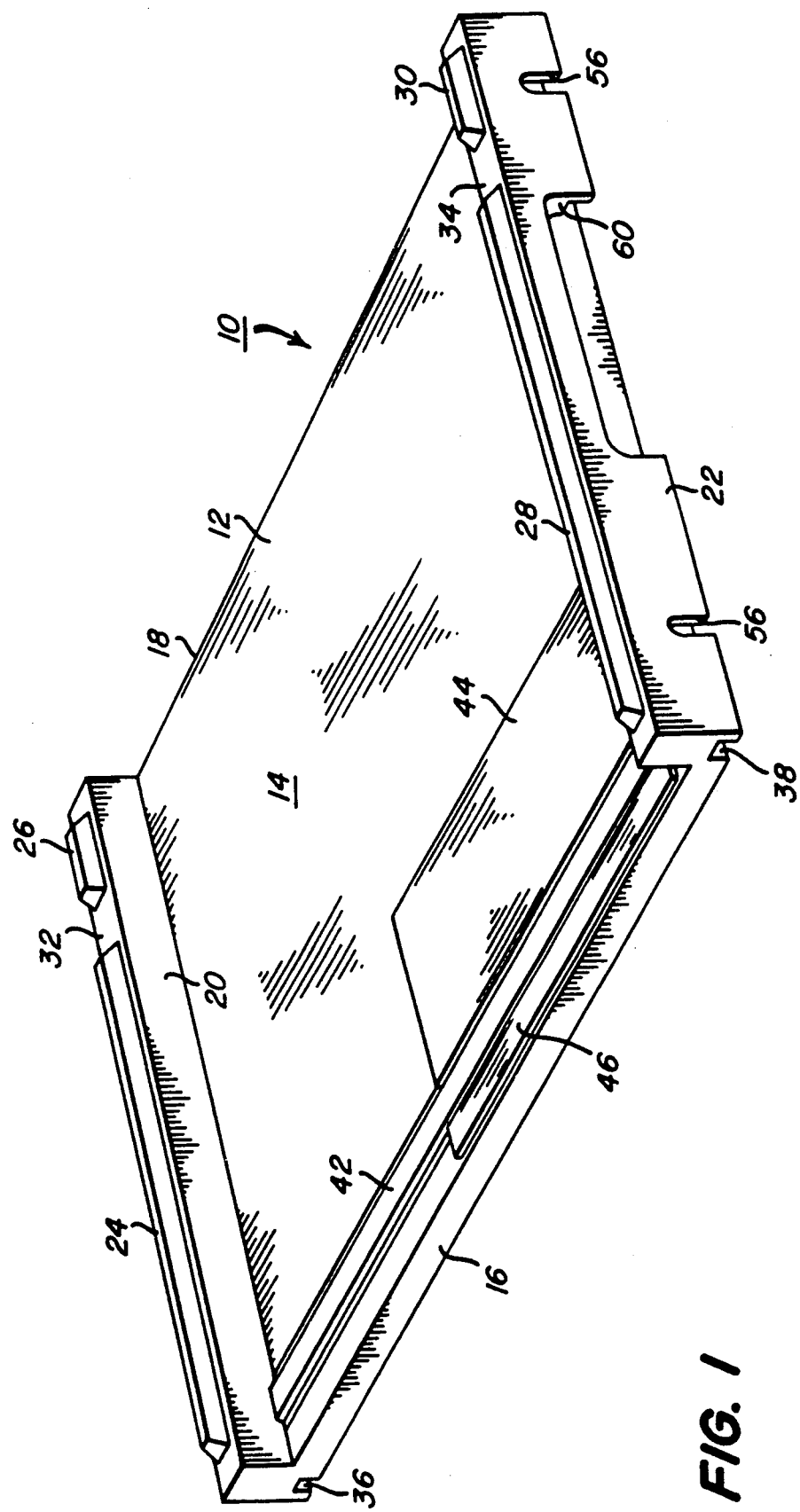
FIG. 1 is a perspective view illustrating a preferred embodiment of a pallet of the invention.
Figure 2:
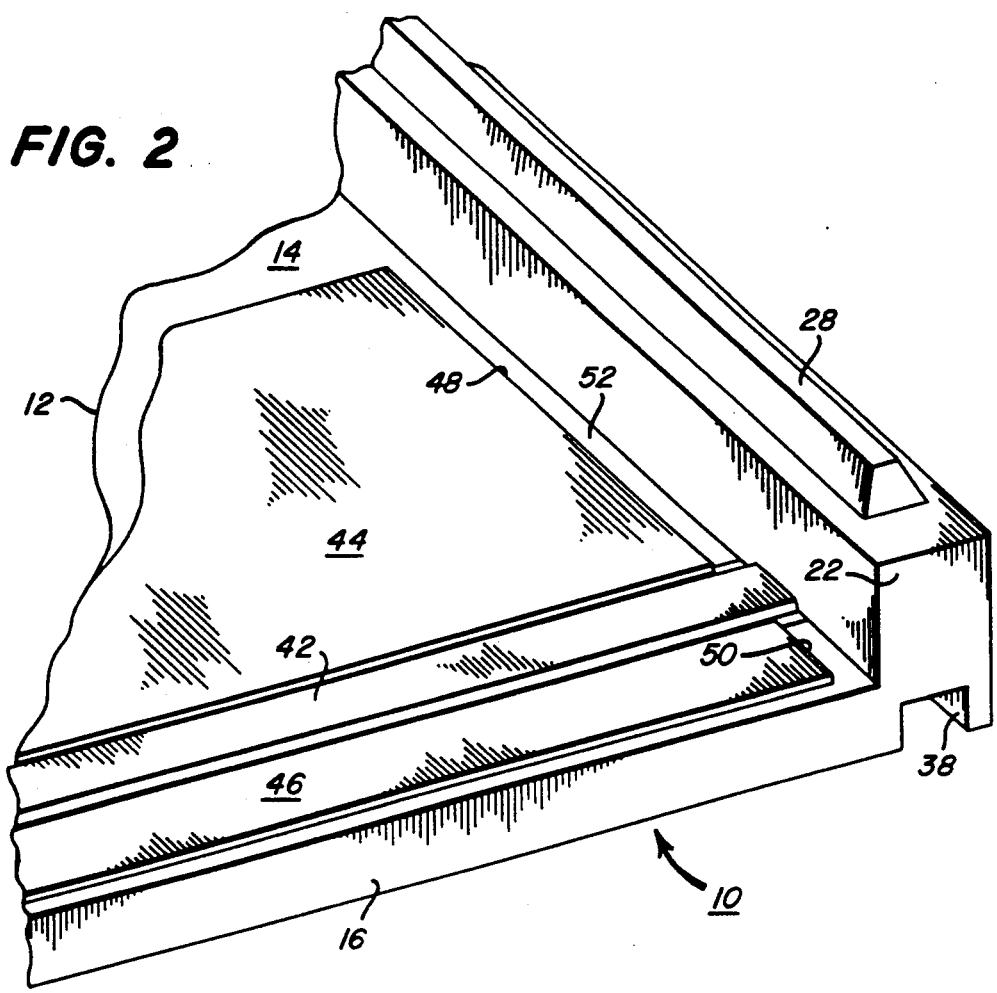
FIG. 2 is an enlarged fragmentary perspective view illustrating features of the pallet that register a cassette on the pallet.
Figure 3:
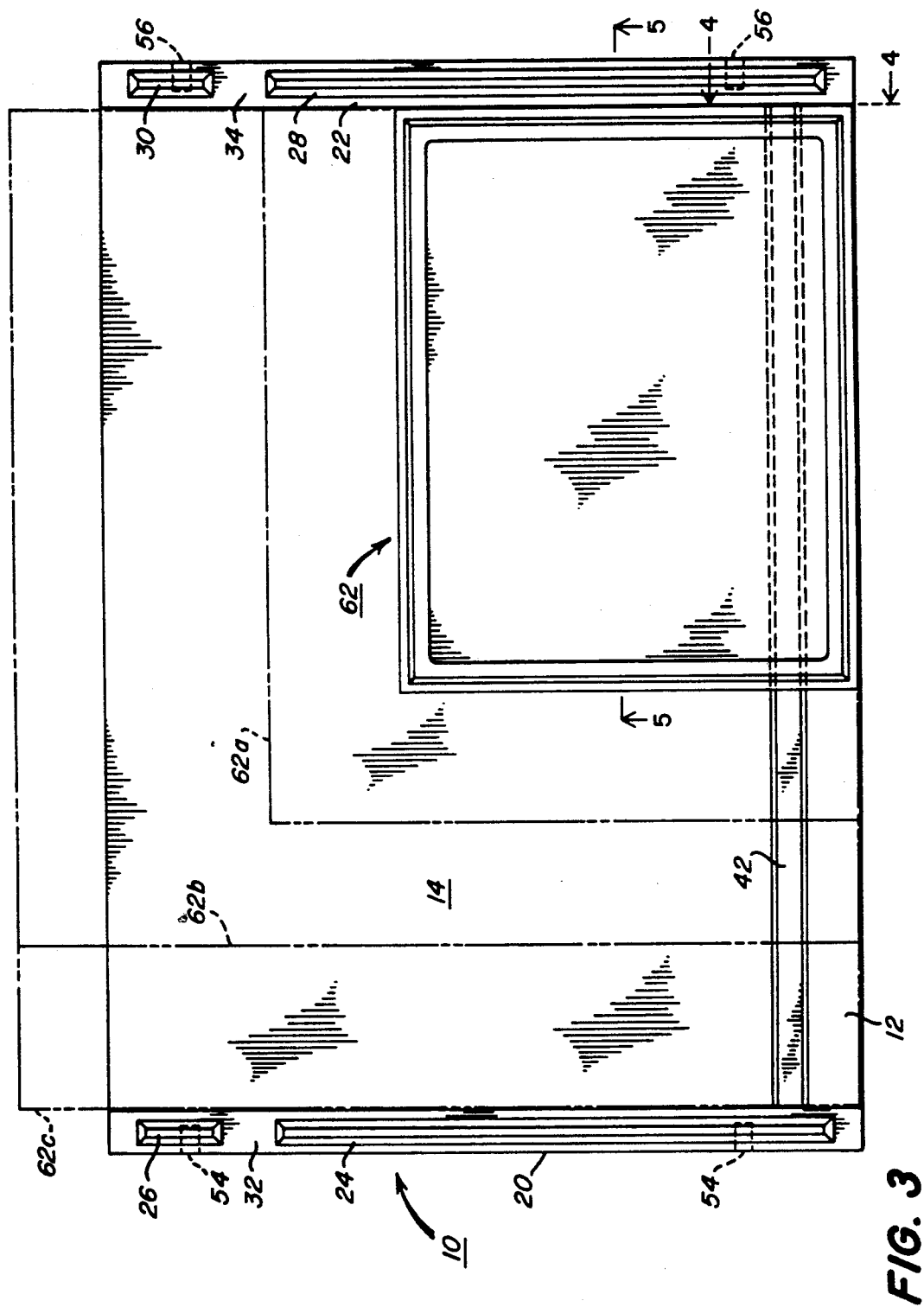
FIG. 3 is a plan view of the pallet showing a cassette registered on the pallet and illustrating in phantom cassettes of different sizes that can be carried by the pallet.

Referring initially to FIGS. 1-3, a pallet of the present invention is generally designated 10 and comprises a generally rectangular bottom plate 12 having a substantially flat upper surface 14. The plate has edges 16 and 18 that are parallel to each other and will be referred to herein as the front edge 16 and rear edge 18. The upper surface 14 of the pallet is adapted to receive and register a cassette as described later.

A pair of side rails, generally designated 20 and 22, are located along opposite sides of the surface 14 and extend in a direction perpendicular to edges 16,18. The rails extend the full distance from the front edge 16 to the rear edge 18 of the pallet and project above the surface 14 of the pallet by a distance sufficient to allow a similar pallet to be stacked on the top of the rails without interference with a cassette on the surface 14.

The rails are provided with locating means for accurately positioning one pallet on top of another pallet in a predetermined relationship. As illustrated in the drawings, the locating means comprises a pair of projections 24,26 on rail 20 and corresponding projections 28,30 on rail 22. Projections 24-30 are located on the top surface of the rails and preferably extend substantially the full length of the rails. However, projections 24,28 are substantially longer than the projections 26,30 with the ends of projections 24,28 being spaced from the projections 26,30 to leave relatively short spaces 32,34 between the pairs of projections. Projections 24, 26, 28 and 30 are preferably trapezoidal in shape, with the top and bottom being parallel to each other and with the top surface being narrower than the bottom of the projections.

The locating means also comprises elongate recesses 36,38 in the bottom surface of the rails 20,22, respectively. These recesses are illustrated as being rectangular in cross section and having a width substantially equal to or slightly wider than the maximum width of the projections 24-30. Thus, when one pallet 10 is stacked on top of another, the recesses 36,38 of the upper pallet receive the projections 24-30 of the lower pallet with the relative dimensions between the projections and recesses assuring a precise left-to-right alignment of the pallets with respect to each other. In case the pallets are slightly misaligned as they are being stacked, the lower corner of the recesses can slide along the tapered sides of the projections and effect precise alignment.

Figure 6:
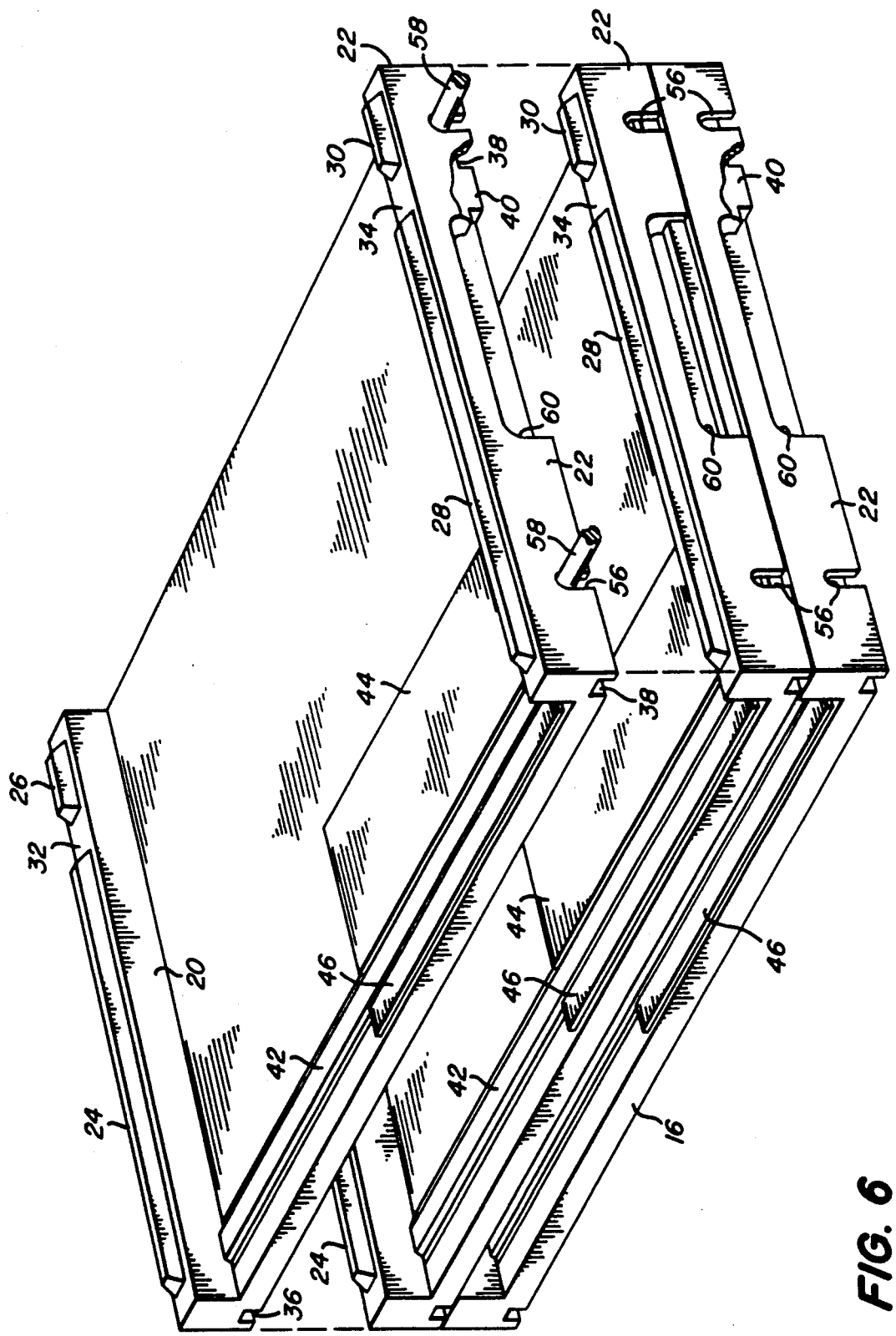
FIG. 6 is a perspective view illustrating the manner in which pallets can be stacked on top of each other.

In order to establish precise alignment in a front-to-rear direction, recesses 36,38 each are interrupted near the rear edge 18 of the pallet by a downwardly projecting wall as shown at 40 in FIG. 6 for recess 38. Each wall 40 is located along the rail so that it enters one of the spaces 32,34 between the projections 24,26 or 28,30. The length of each wall 40 is substantially equal to the spacing between the projections on either of the rails 20,22 so that the wall serves to establish front and rear alignment of the rails of adjacent pallets. The ends of each wall 40 preferably extend in a vertical direction so that they can slide along the tapered end faces of the projections 24-30 as one pallet is lowered onto another one. The asymmetrical arrangement of projections 24-30 and walls 40 prevents stacking of pallets unless they are all oriented in the same manner. Thus, in a stack of pallets, the front edges 16 of all pallets are located one above the other.

Figure 4:
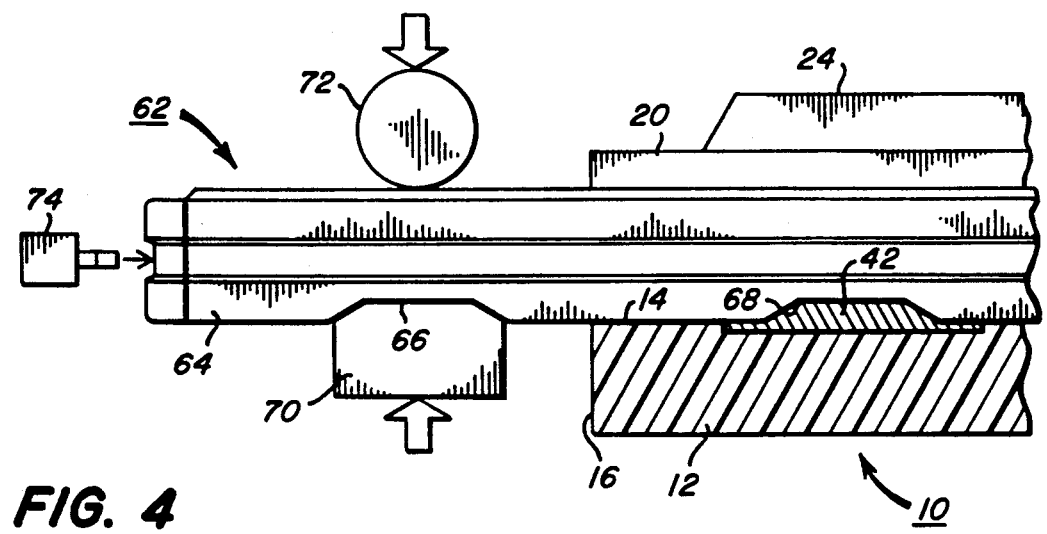
FIG. 4 is a fragmentary cross section through the pallet, taken along line 4—4 in FIG. 3, and further illustrating parts of a computed radiography reader.
Figure 5:
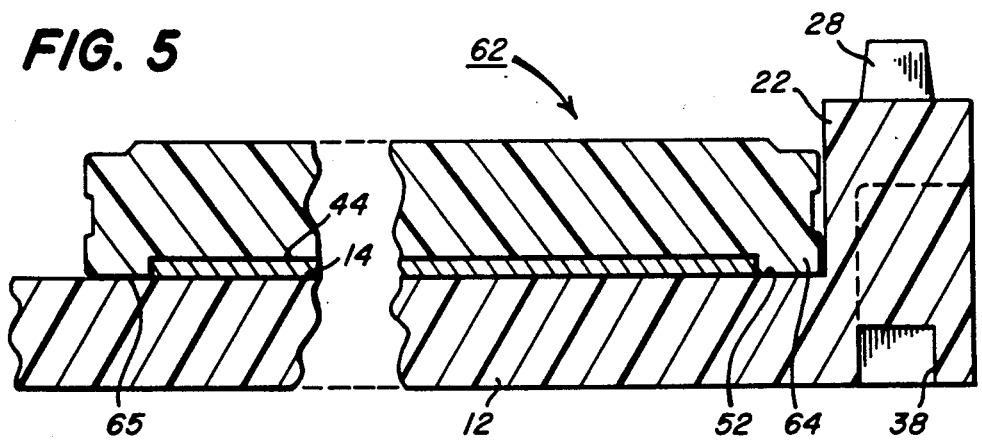
FIG. 5 is a fragmentary transverse cross section taken along line 5—5 of FIG. 3.

The pallet is provided with means for registering cassettes of one or more sizes on the surface 14 of the pallet. More specifically, the registration means includes a rib 42 that extends from rail 20 to rail 22 at a position where it is adjacent but spaced from the front edge 16 of plate 12 and generally parallel to the front edge. As illustrated in FIG. 4, rib 42 preferably is recessed in the surface 14 of the plate and has side edge portions thereof with upper surfaces that are substantially coplanar with the surface 14 so that a cassette will not engage the vertical side edges of the rib. The top of the rib is flat and is elevated above surface 14. The top of the rib tapers downwardly to the side edge portions to facilitate movement of a cassette across the rib from one position to another. The rib serves to establish the position of the cassette in a direction perpendicular to the front and rear edges 16 and 18 of the pallet The registration means further comprises a pair of rectangular plates 44,46 that are secured to the upper surface 14 of the pallet Plates 44,46 are located on opposite sides of the rib 42 and project above the upper surface 14 by a distance less than the top of the rib 42. As best shown in FIGS. 2 and 5, the plates 44,46 have side edges 48,50 which are parallel to and spaced from rail the inner surface of 22 to form a shallow recess in the shape of a trough 52 on both sides of the rib 42. Trough 52 cooperates with a portion of the cassette to establish the registered position of the cassette between the rails 20,22.

Referring now to FIGS. 1, 3 and 6, rail 20 has a pair of slots 54 adjacent the front and rear edge of the pallet, and similar slots 56 are provided in the rail 22. Slots 54,56 extend from the bottom of the rails upwardly about half the height of the rails and by a distance that exceeds the width of the slots. Slots 54,56 are adapted to receive pins 58 as shown in FIG. 6. Pins 58 can be part of an autoloader which handles pallets and cassettes so the cassettes can be fed to a read and erase unit of the kind used in computed radiography.

As shown in FIGS. 1 and 6, pallet 10 has a portion of each side rail 22 cut away to form a recess or handle 60 in the outer surface of the rail midway between the front and rear edges of the rail. Recess 60 preferably extends from the bottom edge of the rail upwardly about half way through the rail. Similar recesses (not shown) are provided in rail 20 of the pallet. These recesses enable a person to grasp and move the pallet by placing fingers in the recess 60 and on the top of the rails.

As mentioned previously, pallets 10 are adapted to receive and register cassettes of a kind suitable for use in computed radiography. A cassette of this kind is illustrated in FIGS. 3-5 and generally designated 62. The cassette is rectangular in shape and holds within the cassette a photographic element (not shown) on which an image is formed. As noted previously, the cassette is registered on the pallet 10 by rib 42 and the trough 52 formed by plates 44,46 and the adjacent side of the rail 22. More specifically, cassette 62 has a projecting edge or bead 64 (FIG. 5) which extends along the right side edge of the cassette and projects downwardly below the surface of the bottom of the cassette. This projecting edge or bead is dimensioned so that it fits within the trough 52 formed by plates 44,46 and the adjacent surface of the side rail 22, thereby locating the cassette in a left-to-right direction as viewed in FIGS. 3 and 5. Thus the right edge of the cassette is located against the inner wall of the rail 22.

As shown in FIG. 4, the edge or bead 64 has a pair of locating notches 66,68 that are spaced a short distance from each other. The notch 66 is adjacent but spaced from the front edge of the cassette. Notches 66,68 are shaped to conform to the upper surface of the rib 42, as shown in FIG. 4, so that when either of the notches 66,68 is aligned with the rib 42, the cassette is registered on the platen and located in a front-to-rear direction. When notch 66 is aligned with the rib 42, the cassette is located in the position illustrated in FIG. 3, wherein the front edge of the cassette is substantially co-planar with the front edge 16 of the pallet. When notch 68 is aligned with the rib 42, the front edge of the cassette is spaced from edge 16 of the pallet, as shown in FIG. 4, so that a portion of the cassette, including notch 66, projects from the edge of the pallet. This enables notch 66 to engage an alignment bar 70 while the top of the cassette is engaged by a roller 72 to firmly locate the front edge of the cassette at a predetermined position While in this position, the cassette is engaged by a mechanism shown generally at 74 for extracting the photographic element from the cassette. Bar 70, roller 72 and mechanism 74 can be part of a computed radiography reader.

A second edge or bead 65 (FIG. 5) can be provided along the left side edge of the cassette, i.e., the edge facing rib 20. This edge, like edge 64, projects downwardly below the bottom surface of the cassette and has locating notches, as shown at 66,68 for edge 64, to receive rib 42 and help align the cassette in each of two positions on the pallet.

Cassettes of different sizes can be located on the pallet 10. Thus, cassettes shown in phantom at 62a, 62b and 62c in FIG. 3 can also be located and registered on the upper surface 14 of the pallet. It will be understood that each of the cassettes 62a-62c will have edges or beads as shown at 64 and 65 for cassette 62, with each bead having a pair of notches as shown at 66,68 for the cassette 62.

As will be observed from FIG. 4, the thickness of cassette 62 is less than the height of rails 20 and 22 above the surface 14 of the pallet. In other words, the rails project above the top surface of the cassettes. This enables several of the cassettes to be stacked one on top of each other, in the manner illustrated in FIG. 6, without interfering with movement of the cassette on any of the pallets in the stack.

Figure 7:
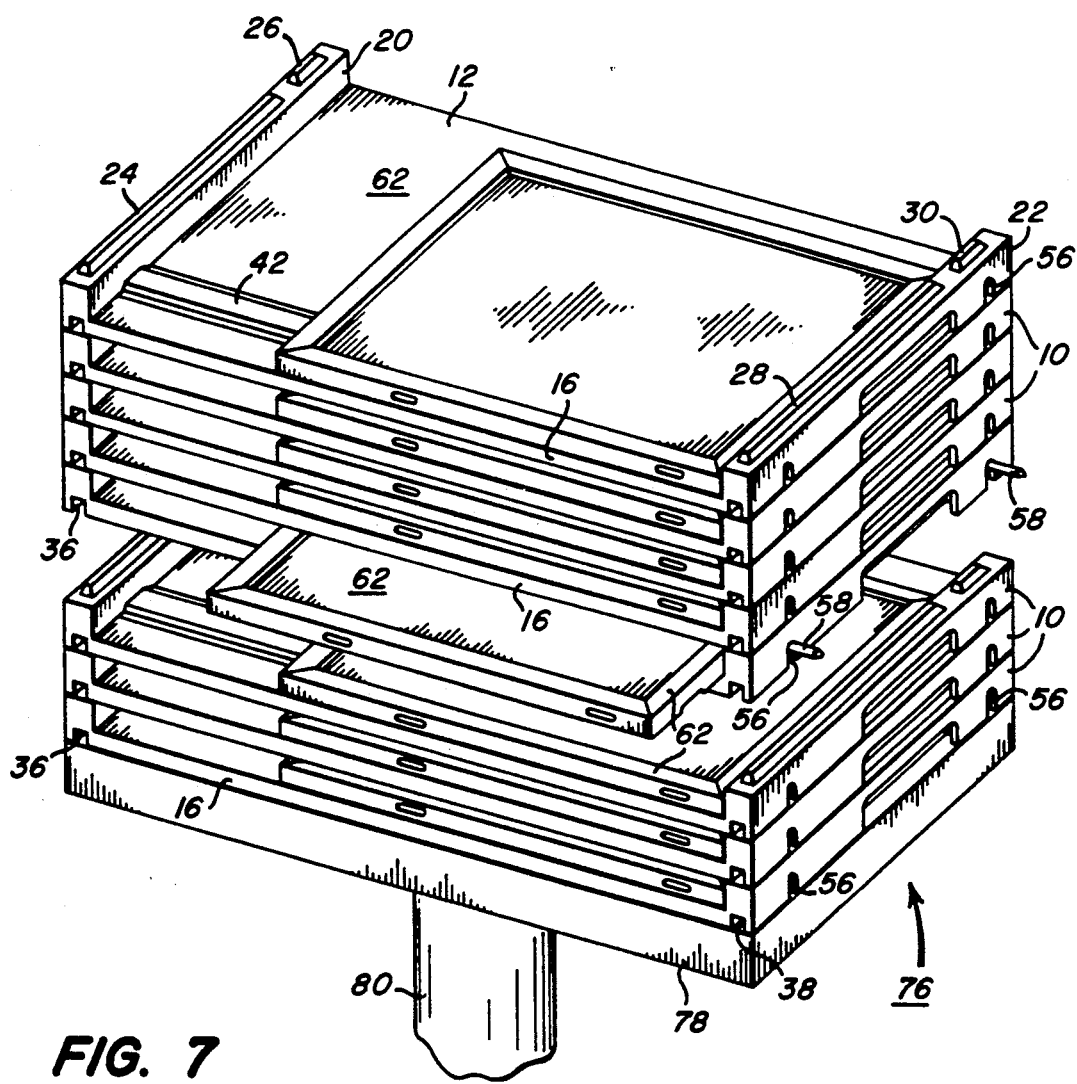
FIG. 7 is a fragmentary perspective view of a portion of an autoloader illustrating several pallets containing cassettes being located on the autoloader.

FIG. 7 illustrates several pallets with cassettes loaded on an autoloader generally designated 76. The autoloader comprises a platform 78 for supporting one or more pallets 10 containing cassettes 62. The platform is indexed vertically by an elevator mechanism 80. Pins 58 described previously comprise part of the autoloader. The pins are located to enter slots 56 of a pallet positioned opposite the inlet to a computed radiography reader (not shown).

FIG. 7 illustrates the pins 58 supporting the forth pallet from the bottom of the stack and with the cassette 62 on that pallet withdrawn partially from the pallet so the photographic element in the cassette can be fed into the reader. After the photographic element is read, erased and returned to the cassette, the cassette is moved back to the position where it is substantially aligned with the front edge 16 of the pallet. Then platform 78 is raised by mechanism 80 until the pallet at the entrance to the reader is elevated slightly by the next lower pallet (or by the platform itself, if the lower-most pallet is at the entrance to the reader). Once the pallet at the entrance to the reader is thus supported by the next lower pallet, the pins 58 are retracted and elevator mechanism 80 locates another pallet at the entrance to the reader.

A number of advantages are achieved by the pallet of the invention. The pallet is easily handled by an operator grasping the pallet at the recess on handle 60. Also, several pallets with cassettes thereon can be stacked one above another without interfering with movement of any cassette in the stack, thus making it feasible to automate feeding cassettes sequentially to a reader as explained in the description of FIG. 7. This reduces operator time required for feeding cassettes to a reader.

The invention has been described in detail with particular reference to a preferred embodiment thereof, but it will be understood that variations and modifications can be effected within the spirit and scope of the invention.

I claim:

1. A pallet for a cassette, the pallet comprising:
   a surface for supporting a cassette,
   registration means on the surface for locating a cassette on the surface in 1) a first position wherein a portion of the cassette can be transported by the pallet and 2) a second position wherein the cassette projects from the surface of the pallet, and
   means on the pallet for supporting a second pallet above the surface and above a cassette located on the surface so that a plurality of pallets with cassettes thereon can be stacked one above the other.

2. A pallet for holding a cassette, the cassette having a projection and a recess for registering the cassette relative to the pallet, the pallet comprising:
   a surface for supporting a cassette on the pallet, the surface having a recess for receiving the projection on the cassette and a projection for receiving the recess on the cassette so that the cassette can be registered on the surface,
   a pair of rails on opposite sides of the surface, a portion of each of the rails projecting above the surface by a distance sufficient to allow a similar pallet to be stacked on top of the rails without interference with a cassette on the surface, and the rails having locating means for accurately positioning one pallet on top of another pallet in a predetermined relationship.

3. A pallet as set forth in claim 2 wherein the recess in the surface for registering a cassette is parallel to and adjacent to one of the rails, and the projection on the surface is perpendicular to the recess and extends from one rail to the other rail.

4. A pallet as set forth in claim 2 wherein the locating means on the rails comprises projections and recesses on the rails located so that the projections on one pallet are received in the recesses of an adjacent pallet when one pallet is stacked on top of another.

5. A pallet as set forth in claim 4 wherein the projections on the rails are trapezoidal in shape, and the projections are on top of the rails and the recesses are on the bottom of the rails.

6. A pallet as set forth in claim 4 wherein the projections and recesses are asymmetrical so that the pallets can be stacked in only one orientation with respect to adjacent pallets in the stack.

7. A pallet as set forth in claim 2 wherein the rails have a plurality of openings in the sides thereof for receiving part of an elevator mechanism so that the pallet or a stack of pallets can be raised and lowered by the mechanism.

8. A pallet as set forth in claim 2, wherein each rail has a recess formed in the outer surface thereof approximately midway between the front and rear edges of the rail, the recesses each being sufficiently large to enable a person to grasp and move the pallet by placing fingers in the recess.

* * * * *